(12) United States Patent
Pack et al.

(10) Patent No.: US 10,923,694 B1
(45) Date of Patent: Feb. 16, 2021

(54) SAFETY BATTERY PACK AND PROTECTIVE ENCLOSURE TO REDUCE BATTERY FIRE OR EXPLOSION DAMAGE

(71) Applicants: Thomas Pack, Boca Raton, FL (US); William Cox, Sunrise, FL (US); Ricardo Raimondo, Lauderhill, FL (US); Santiago Contreras, Plantation, FL (US)

(72) Inventors: Thomas Pack, Boca Raton, FL (US); William Cox, Sunrise, FL (US); Ricardo Raimondo, Lauderhill, FL (US); Santiago Contreras, Plantation, FL (US)

(73) Assignee: ACR Electronics, Inc, Fort Lauderdale, FL (US)

( * ) Notice: Subject to any disclaimer, the term of this patent is extended or adjusted under 35 U.S.C. 154(b) by 15 days.

(21) Appl. No.: 15/421,586

(22) Filed: Feb. 1, 2017

Related U.S. Application Data

(60) Provisional application No. 62/290,032, filed on Feb. 2, 2016.

(51) Int. Cl.
| | |
|---|---|
| *H01M 2/10* | (2006.01) |
| *H01M 2/20* | (2006.01) |
| *G08B 29/18* | (2006.01) |
| *H01M 6/42* | (2006.01) |
| *H01M 6/50* | (2006.01) |
| *G08B 17/08* | (2006.01) |
| *G08B 25/10* | (2006.01) |
| *B64D 45/00* | (2006.01) |

(52) U.S. Cl.
CPC ............ *H01M 2/105* (2013.01); *G08B 17/08* (2013.01); *G08B 29/181* (2013.01); *H01M 2/1038* (2013.01); *H01M 2/204* (2013.01); *H01M 6/42* (2013.01); *H01M 6/50* (2013.01); *B64D 45/00* (2013.01); *B64D 2045/009* (2013.01); *G08B 25/10* (2013.01); *H01M 2220/20* (2013.01); *H01M 2220/30* (2013.01)

(58) Field of Classification Search
CPC ........ H01M 2/105; H01M 2/204; H01M 6/42; G08B 29/181
See application file for complete search history.

(56) References Cited

U.S. PATENT DOCUMENTS

| | | | | |
|---|---|---|---|---|
| 2003/0038611 A1* | 2/2003 | Morgan | ................ | H02J 7/0047 320/121 |
| 2012/0227926 A1* | 9/2012 | Field | .................... | F24D 11/003 165/10 |
| 2014/0210399 A1* | 7/2014 | Urschel | ................. | H02J 7/0045 320/107 |

* cited by examiner

*Primary Examiner* — Ula C Ruddock
*Assistant Examiner* — Frank A Chernow
(74) *Attorney, Agent, or Firm* — Malin Haley DiMaggio & Bowen, P.A.

(57) ABSTRACT

A protective metal enclosure box for lithium batteries that includes batteries subject to fire and explosion comprising a rigid metal covered box that includes an aluminum honeycomb grid core mesh that can receive multiple individual batteries spaced apart from each other and protected from each other thermally and from explosion. The protective battery pack box includes a pair of printed circuit boards for interacting with the batteries for transmitting voltage and amperage outside of said battery pack.

2 Claims, 8 Drawing Sheets

SAFETY BATTERY PACK AND PROTECTIVE ENCLOSURE TO REDUCE BATTERY FIRE OR EXPLOSION DAMAGE

CROSS REFERENCE TO RELATED APPLICATIONS

This application claims priority to U.S. Provisional Application No. 62/290,032 filed on Feb. 2, 2016.

BACKGROUND OF THE INVENTION

1. Field of the invention.

This invention relates to a safety battery pack mounted inside a protective enclosure metal box that may be subject to a battery event such as fire or explosion, and specifically to a fire/explosion protective battery pack and enclosure that includes a metal box containing a honeycomb mesh to separate each battery individually inside the protective enclosure metal box.

2. Description of Related Art

In recent years, lithium batteries have become problematic with respect to battery fires and explosions. As an example, an emergency locator transmitter (ELT) is a battery-powered device that is mounted within an aircraft and is capable of transmitting emergency signals in the event of an aircraft crash. A battery event in an ELT aboard an aircraft could be disastrous to the aircraft. Numerous other examples of mobile devices that have batteries abound that a battery event would be very dangerous.

The invention described herein provides for safely packaging multiple batteries electronically and physically together forming a battery pack, all of which is contained in a protective metal box. The invention enhances the safety of lithium battery usage in any environment to significantly reduce any damage from a battery event such as fire or a battery explosion.

SUMMARY OF THE INVENTION

A safety battery pack and protective enclosure comprising a metal box containing a protective honeycomb mesh for storing and separating individual batteries forming a battery pack, said protective honeycomb mesh reducing fire or explosion damage caused by a single battery.

The battery pack honeycomb mesh has individual chambers in which each battery is mounted and stored individually to provide additional structural protection to the battery pack by preventing an internal explosion or impact or fire from a single battery damaging or igniting other surrounding batteries inside the battery pack.

The battery pack honeycomb mesh and over mold material in which the batteries are mounted individually provide additional structural integrity to the battery pack.

The battery pack uses smaller volume batteries, each containing less lithium for reducing the explosive force of each individual battery. When combined electrically in series or parallel, more smaller batteries could still provide the necessary voltage and current required for a specific device to be used.

In some embodiments the battery pack can use a two phase material system that includes the honeycomb mesh and an over mold material between the batteries to prevent the heat and explosive impact from the explosion of one battery from reaching an adjacent battery.

With respect to the overall battery pack honeycomb mesh that houses all the batteries inside, the device will insulate the battery pack to minimize the heat transfer from the inside out to the entire battery pack.

The use of the present battery package described herein increases the safety of using lithium batteries for transportation purposes.

The battery pack decreases the probability of a catastrophic failure by minimizing the magnitude of an explosion or fire.

The battery pack may provide a pressure vent to safely release the gas pressure within the battery pack after a battery event.

BRIEF DESCRIPTION OF THE DRAWINGS

FIG. 3 C is a perspective view of an over mold or cast of the aluminum honeycomb skeleton.

DETAILED DESCRIPTION OF THE INVENTION

Figure 1:
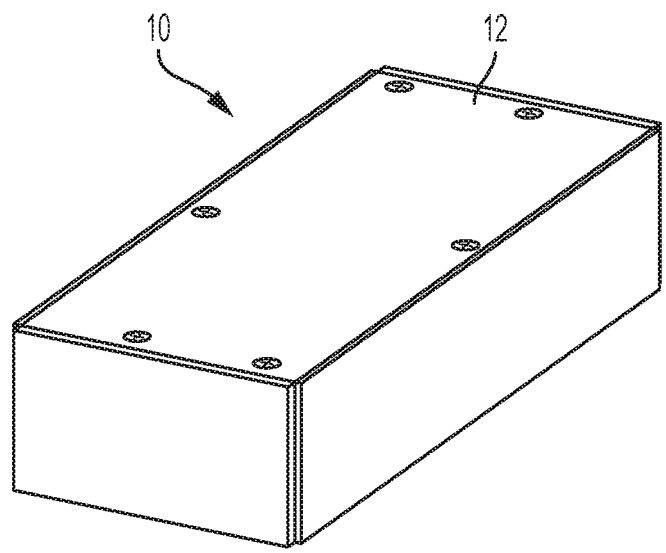
FIG. 1 is a front, left side perspective view of the invention.
Figure 2:
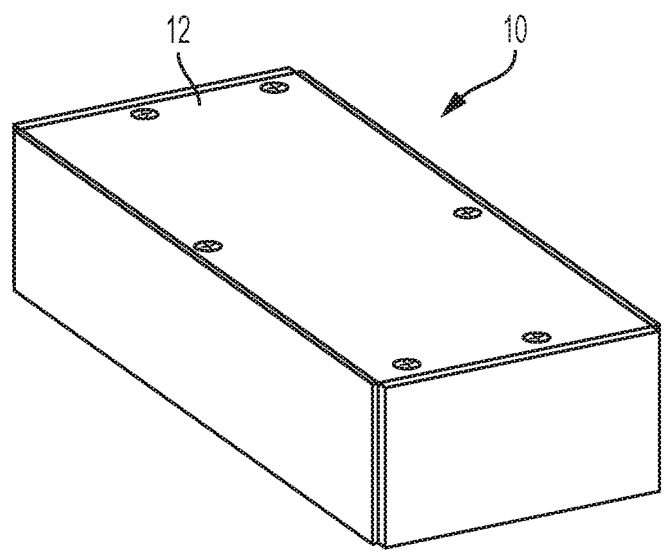
FIG. 2 is a rear perspective view of the invention.

Referring now to the drawings, and in particular FIGS. 1 and 2, a device to safely contain a battery event such as a fire or explosion preventing damage to a surrounding environment comprising a rigid rectangular metal protective lithium battery box 10 that contains a multiple array of batteries individually mounted in a protective honeycomb mesh that can provide electrical power required in almost any type electrical device in any environment safely.

Figure 3:
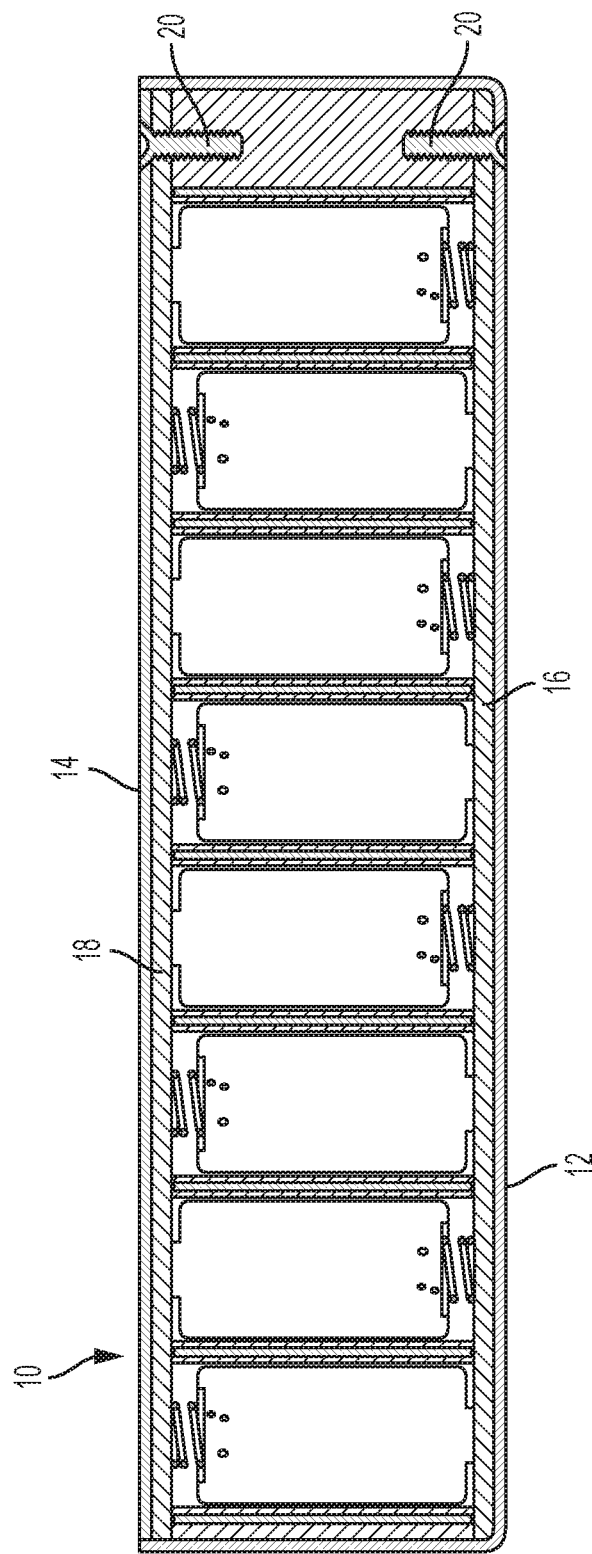
FIG. 3 is a front elevational view in cross section of the invention.

FIG. 3 shows a cross-sectional view inside the protective battery box 10. The battery box 10 is constructed of a fire/explosion barrier metal enclosure 12 and aluminum metal cover 14. The bottom floor of the metal enclosure 12 has mounted thereon a printed circuit board assembly 16 that is utilized with a plurality of batteries that are mounted in individual chambers to be explained below. The metal cover 14 has attached thereto, on the bottom cover surface, a printed circuit board assembly 18 that also is utilized in conjunction with a plurality of batteries mounted inside the protective box 10. A pair of fasteners 20 which are threaded screws attach the bottom and top metal box to the printed circuit boards 16 and 18.

Figure 3A:
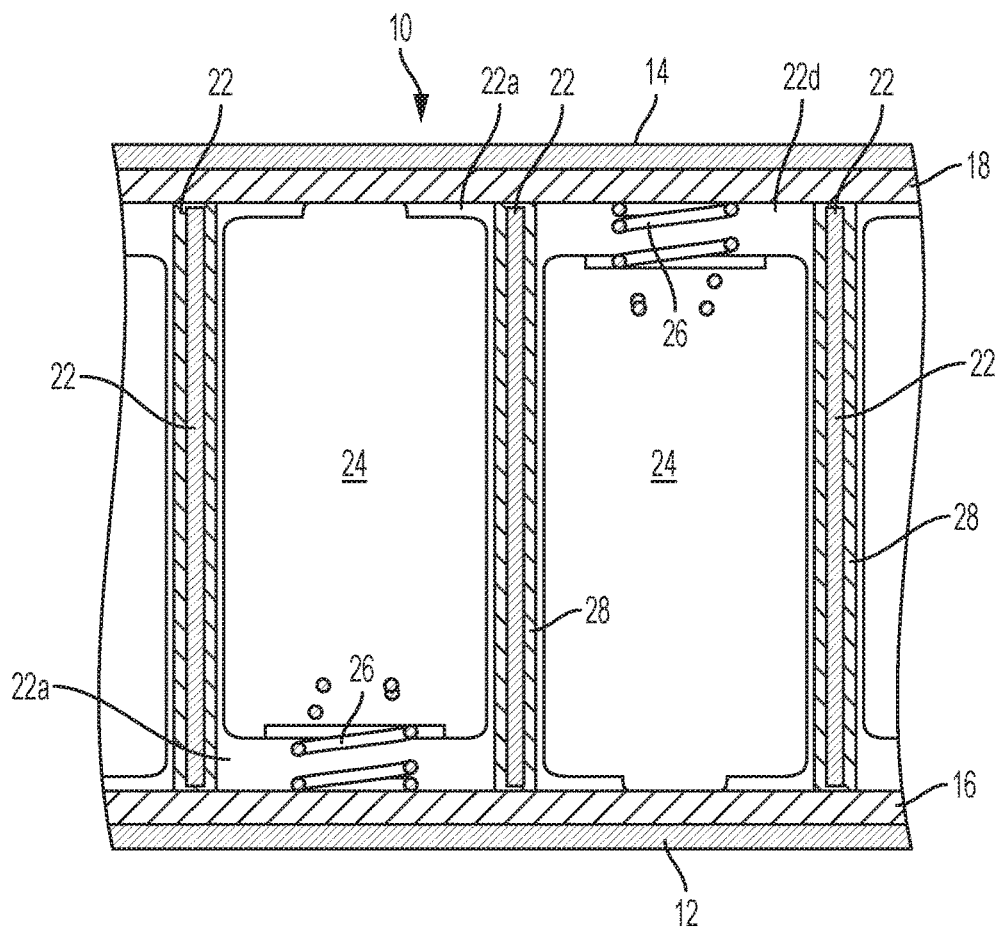
FIG. 3A is a front elevational view partially cutaway of the invention.

FIG. 3A shows a pair of adjacent honeycomb formed battery cell chambers 22a made up of an aluminum honeycomb grid core mesh 22 that is mounted inside the protective box 10 in order to separate each battery mounted in the box from each other in the event of a fire or explosion. A pair of batteries 24 are shown schematically mounted in a honeycomb mesh chamber 22a. Each battery 24 is mounted between the bottom circuit board 16 and the top circuit board 18. Battery springs 26 are shown for connectivity and holding the batteries in place in contact with the printed circuit boards 16 and 18. The purpose of the aluminum honeycomb grid core mesh 22 used in conjunction with over mold or cast material 28 covering the aluminum honeycomb skeleton 22 is to provide thermal and explosive barrier protection between each individual battery 24 in a separate chamber 22a in the event of a battery fire or of an explosion of the battery 24.

The overall objective in providing a series of individually spaced apart protected batteries 24 is to allow the use of much smaller volume batteries that each contain much less material such as lithium. Multiple batteries that can be used together can attain the required voltage and current of a particular system but instead of using a few large batteries that could suffer a large explosion or a large fire, a plurality of smaller individual batteries would be a much safer environment even if there is a battery fire or battery explosion. Since each battery is so much smaller in volume, the consequences of a single battery fire or explosion would be much less with a smaller battery. The battery pack as described in this invention envisions using several small lithium batteries with printed circuit boards to provide the necessary power of all the batteries in series or parallel for any type device in place of having a pair of large batteries, reducing the effects of fire and explosion in a single battery.

Figure 3B:
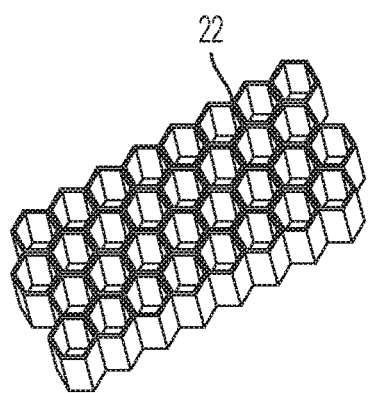
FIG. 3B is a perspective view, partially cutaway of an aluminum honeycomb grid core mesh skeleton.
Figure 3C:
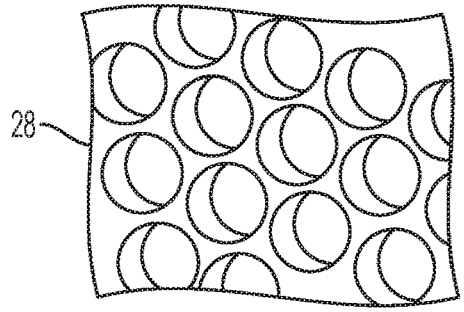

In FIGS. 3A, 3B and 3C the aluminum honeycomb grid core mesh skeleton 22 provides ideal compartmentalization of shape and size to individually hold a battery in a honeycomb channel or passage 22a. By separating these channels with over mold or cast material 28, the aluminum honeycomb grid core mesh 22 is sufficient protection from heat and explosion between adjacent batteries to greatly reduce the effects of a battery fire or explosion.

Figure 4A:
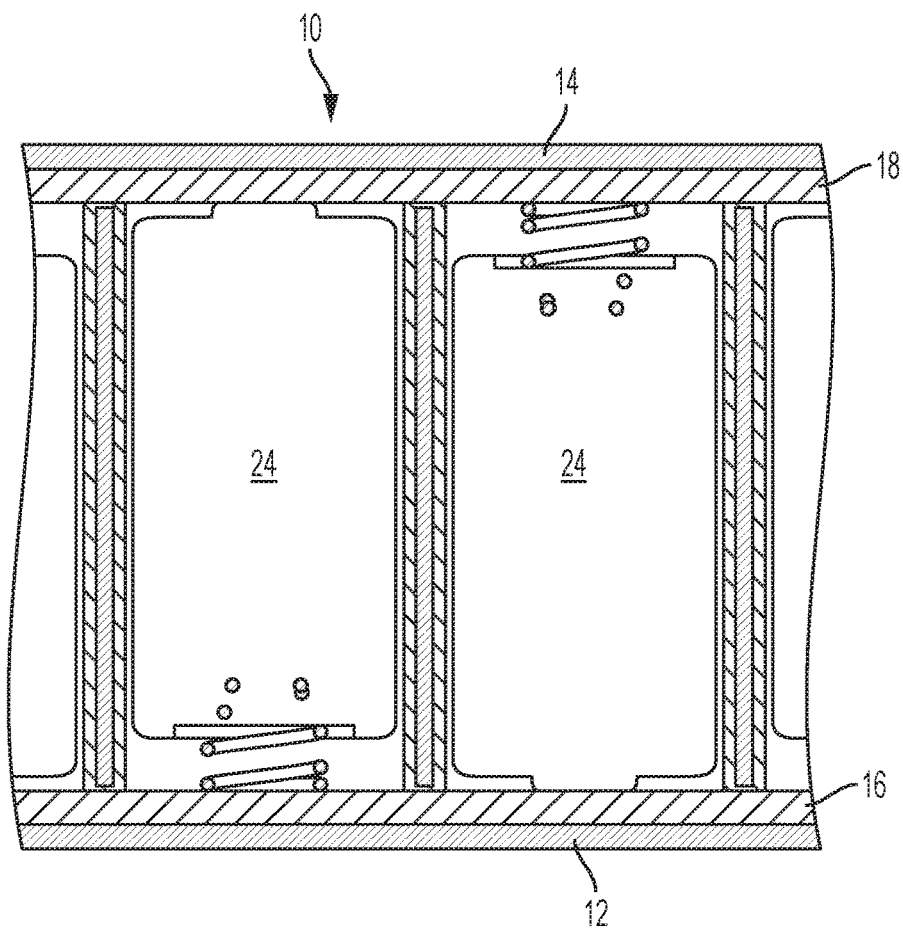
FIG. 4A is a front elevational view partially cutaway of the invention.
Figure 4B:
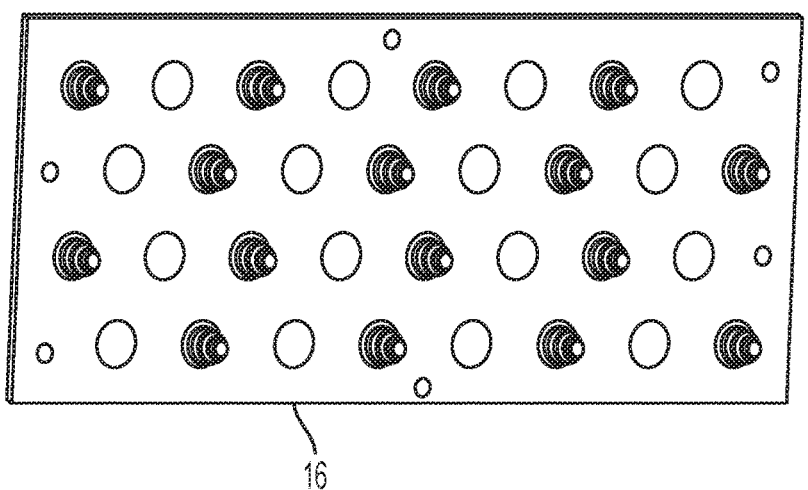
FIG. 4B is a perspective view of PCB printed circuit board used with the battery pack.

FIG. 4B shows a typical printed circuit board 16 that is used with the batteries for connection in series or parallel which constitutes printed circuit board 16 on the bottom and printed circuit board 18 on the top inside the protective box 10 shown in FIG. 4A. The device may also include spacing between the printed circuit boards 16 and 18 and the metal on the bottom wall 12 for the cover 14 by using standoffs to allow room for printed circuit board components.

Figure 5:
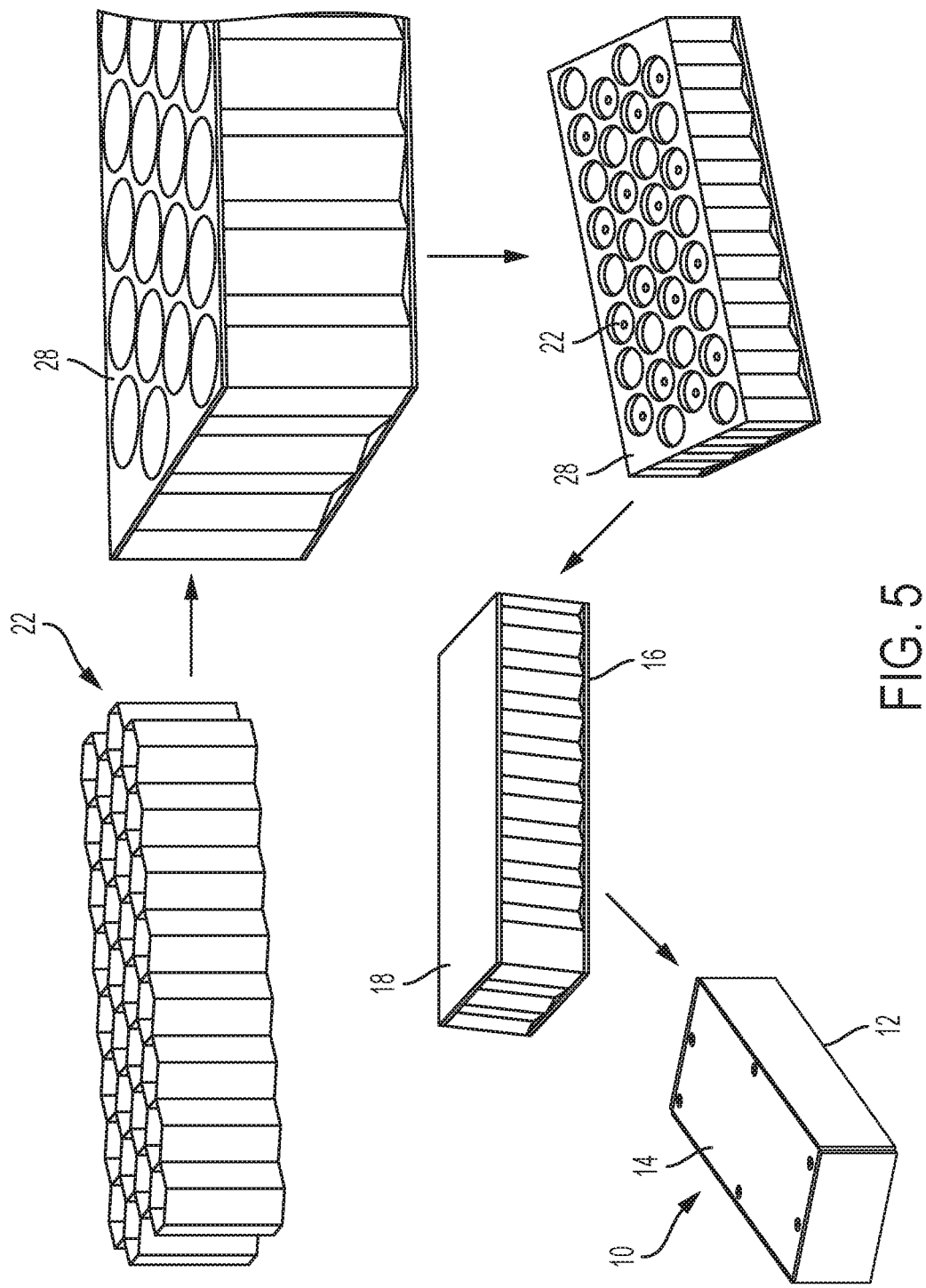
FIG. 5 is a schematic representation of the construction of the present invention from a honeycomb core to the final box.

FIG. 5 shows schematically the construction of the invention beginning with the aluminum honeycomb grid core mesh skeleton 22 which is over molded or cast material 28 with an aluminum honeycomb skeleton over mold 28 resulting in the combination of both of these elements which have been covered on top and bottom by printed circuit board 16 and 18, all of which is mounted inside the protective battery box 10 that includes cover 14 and aluminum metal enclosure 12.

Figure 6:
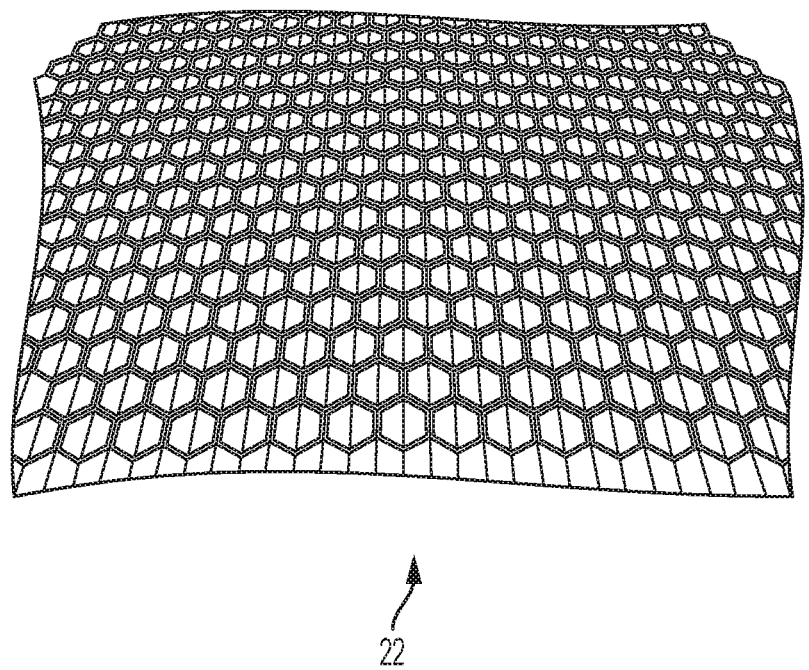
FIG. 6 is a perspective view partially cutaway of a honeycomb grid core mesh skeleton used in the present invention.

FIG. 6 shows the aluminum honeycomb grid core mesh 22 that forms the basic chambers each of which can hold an individual battery in a hexagon chamber. The advantages are that the aluminum honeycomb grid core mesh is inexpensive and available in a variety of sizes. The core mesh is fully customizable to fit any number of batteries. The structure reduces the impact on batteries from an internal or external event such as explosion by distributing the loads and absorbing the impact along the honeycomb structure. The mesh 22 also dissipates heat due to an internal or external event by conducting the heat along the honeycomb instead of to an adjacent compartment or battery.

Figure 7:
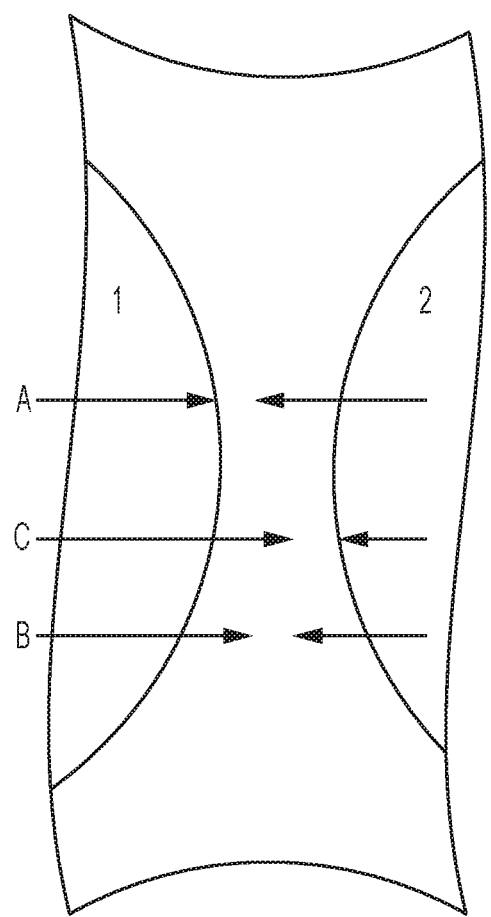
FIG. 7 is a schematic representation to show a wall of the honeycomb mesh demonstrating side-by-side battery isolation and the array of materials used.

Referring now to FIG. 7, a cutaway segment of the over mold or cast and aluminum honeycomb skeleton is shown that includes the aluminum honeycomb grid core mesh with a side-by-side comparison between compartment 1 which would hold the battery and compartment 2 which is adjacent compartment 1. The materials involved should be high temperature resistant, low surface energy materials that can survive high temperature exposure while absorbing impact. Battery isolation from heat and explosion is the objective. If a battery in compartment 1 explodes, the over mold in A absorbs most of the heat and energy. The aluminum honeycomb in B maintains the structural integrity of further diffusing the heat, and the other side of the over mold in C remains fully intact and removes the rest of the heat before reaching the battery compartment 2.

A description of replacing two D size batteries in an emergency locator transmitter ELT with smaller batteries to achieve the proper voltage, amperage and hours of battery operation necessary is provided. Eleven smaller batteries could be used. One D sized has 8 amp-hours versus 1.5 amp hours for a smaller Panasonic battery. This gives the options in the honeycomb arrangement of having two rows with one row with six batteries in one row with five batteries or three rows with one row of four batteries, one row with three batteries and one row with four batteries. Replacing the two (2) D size Ultralife U10015 batteries from the ELT with smaller Panasonic CR123 A batteries would require the following; One D. size Ultralife U10015 has 8 amp-hrs vs 1.5 amp-hrs for the CR123A battery, therefore, 1 Ultralife is equivalent to 5.333 CR123A, and two Ultralife batteries in the ELT will require 11 CR123A batteries to provide the required amp-hrs. (2) U10015 (11) CR123A. This give us two options in the honeycomb arrangement. 2 rows: one row with 6 CR123A, and one row with 5 CR123a. 3 rows: one row with 4 CR123A one row with 3 CR123A, and one row with 4 CR123A. Dimensions (L×W×H) of these two options (including the sheet metal enclosure): 2 row 5.11"×1.85"×1.79". 3 rows: 3.50"×2.55"×1.79". The battery cavity inside the ELT IS 3.40"×0.04"×0.18".

Again the advantage of using smaller batteries even though more batteries are required is that an individual battery event such as a fire or explosion will have a much lesser detrimental effect (destructive force) on the entire device than using much larger batteries that have more fire power and more explosive power.

Figure 8:
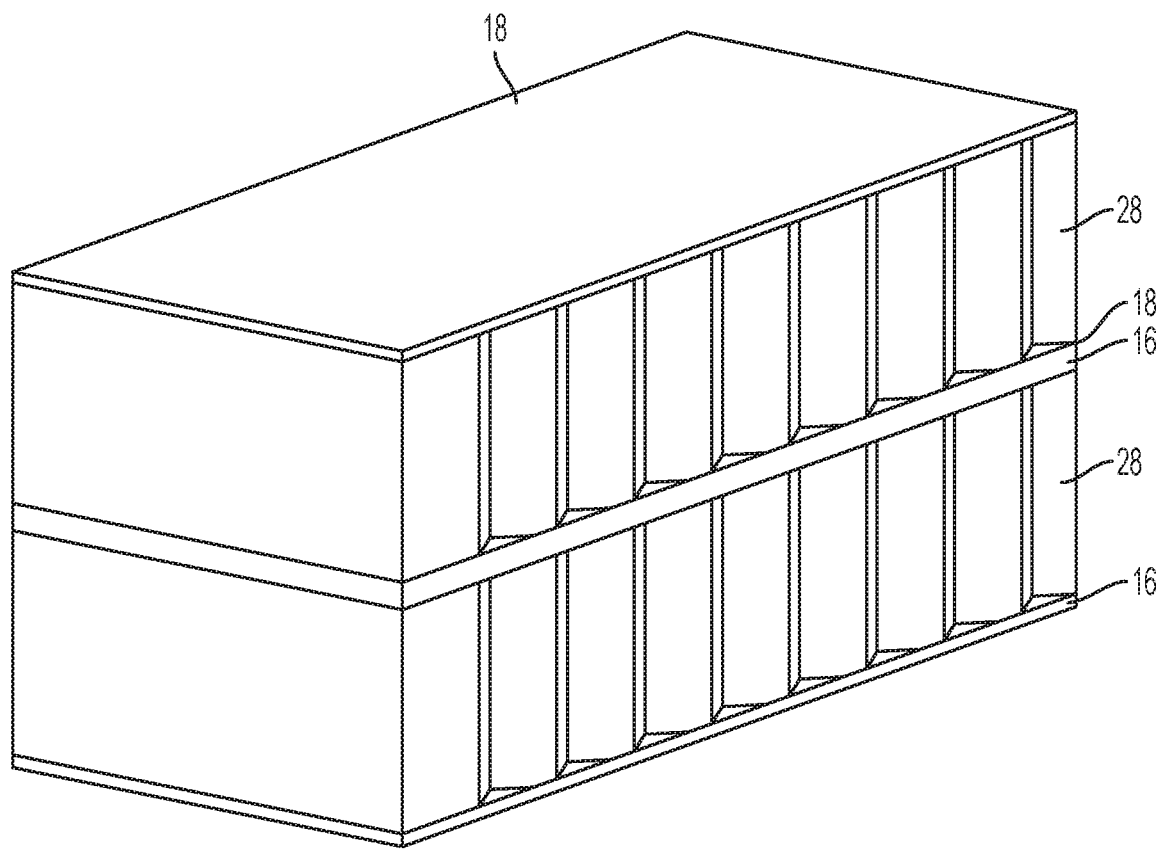
FIG. 8 is a schematic perspective view that shows honeycomb mesh battery storage arrays that are stacked vertically with batteries.

FIG. 8 shows an alternate embodiment in which the honeycomb systems may be stacked to multiple levels to connect batteries vertically as well as horizontally. As shown there are two honeycomb systems 28 stacked on each other, separated by printed circuit boards 16 and 18 that allow stacking batteries vertically as well as horizontally.

There are over mold alternatives that can be used such as a thin film bag like material filled with sand or ceramic fiber material that encapsulates the batteries within the aluminum honeycomb cavities and cells. Also a hollow cylinder of orbothane (an extreme low surface energy material which absorbs impact) that encapsulates the batteries within the honeycomb cavities and cells. Alternatively a hollow cylinder of a new lightweight moldable steel can encapsulate the batteries each battery within each of the honeycomb cavities and cells.

What we claim is:

1. A metal rigin rectangular box, for safely providing a lithium batter pack and enhancing the safety of lithium battery usage for powering an Emergency Locator Trasmitter (ELT) in an aircarft to significantly reduce any damage from a battery event such as fire or a battery explosion, having a removable metal rigid rectangular cover, said metal box being fire-proof and explosion resistant from the inside outwardly, said rectangular box and cover form an enclosure;

a lithium multiple safety battery pack, having electrical output power in amp-hours power required to power an ELT, mounted inside said rectangular box enclosure; said lithium multiple safety battery pack including a pair of printed circuit boards and an aluminum honeycomb grid core mesh having a plurality of thermally insulating, individual chambers, each chamber sized to receive a separate lithium batter smaller in volume, diameter, and height, than a standard D sized lithium battery capable of producing one half the amp-hours required to power an ELT, between the printed circuit boards, said multiple smaller volume than D size individual lithium batteries, having less lithium per battery, having output power in amp-hours equal to two standard size D lithium batteries, in the event of an internal battery fire or explosion, the safety on the impact environment around the battery pack and rigid metal box is greatly enhanced using more lithium batteries, each battery containing less volume of lithium, wherein the lithium batteries in the battery pack are electrically connected to an emergency local tranmistter (ELT) in an aircraft.

2. A metal rigid rectangular box for safely providing a lithium battery pack as in claim 1, including:

at least 11 lithium batteries, together having output electrical power required in amp-hours to power an ELT, each battery smaller in volume, diameter and height, than a D sized lithium battery, each smaller lithium battery with less lithium per battery, each lithium battery mounted separately in each thermally insulated battery pack chamber, said 11 lithium batteries having the electrical power equivalent to 2 D size lithium batteries to reduce the fire or explosive effect of a single defective lithium battery inside said battery pack.

\* \* \* \* \*